United States Patent [19]

Maloy

[11] 4,186,372
[45] Jan. 29, 1980

[54] BRUSH HOLDER FOR RECTILINEAR RECORDER

[75] Inventor: Rex M. Maloy, Broken Arrow, Okla.

[73] Assignee: Lowrance Electronics, Inc., Tulsa, Okla.

[21] Appl. No.: 945,486

[22] Filed: Sep. 25, 1978

[51] Int. Cl.² .................... G01S 7/60; G01D 15/06
[52] U.S. Cl. .............................. 367/115; 346/139 C; 346/139 A
[58] Field of Search ........... 346/139 A, 139 B, 139 C; 340/3 F

[56] References Cited

U.S. PATENT DOCUMENTS

| | | | |
|---|---|---|---|
| 2,633,405 | 3/1953 | Nelson | 346/139 A |
| 3,392,404 | 7/1968 | Ross | 346/139 C |

Primary Examiner—Richard A. Farley
Attorney, Agent, or Firm—Head & Johnson

[57] ABSTRACT

An improved brush holder for use in a rectilinear recorder which utilizes a web of electrical recording paper, which passes across, and in contact with a plane metal back-up plate. A narrow belt loop is supported by a pair of spaced rollers and is driven in a direction transverse to the longitudinal motion of the recording strip or web. One linear portion of the loop of the belt is parallel to and spaced a small distance from the plane of the metal back-up plate. The belt is of insulating material and has attached to it an electrical contact means which is a metal plate fastened to the belt and transverse to the axis of the belt and is long enough to extend some distance on each side of the belt. An electrical contact plate is mounted in the plane of the back-up plate and spaced from it. The belt is positioned so that the two ends of the contact plate extend respectively over the back-up plate and the electrical contact plate. A wire contact brush is removably attached to the contact plate with the improved brush holder. The wire brush has two ends, one of which engages the paper, and the other engages the electrical contact plate, so that as the belt moves transverse to the paper, which is in contact with the back-up plate, the electrical potential on the electrical contact plate is transferred by the wire brush to the paper.

4 Claims, 5 Drawing Figures

BRUSH HOLDER FOR RECTILINEAR RECORDER

BACKGROUND OF THE INVENTION

1. Field of the Invention

This invention lies in the field of rectilinear recorders.

More particularly, this invention involves an improved brush holder which is mounted on a continuously moving belt loop of insulating material carrying a contact means so that successive sweeps of the recording sheet are made as the recording sheet moves in a direction perpendicular to the belt travel.

2. Description of the Prior Art

In the prior art, many indicating instruments have been used in conjunction with a sonar transmitter and receiver for indicating by a flashing light the time of travel and correspondingly the depth of a reflecting interface below the surface of a body of water, which is traversed by the vehicle carrying the sonar transmitter. Similarly, curvilinear recorders have been made using the same principles of a rotating arm carrying a contact wire that is carried across a wide strip of paper that is sensitive to electrical potential so that a curved record can be made of a potential applied to the wire.

Other types of rectilinear recorders have been used in which an electrical contact wire is carried by a moving belt to convey electrical signals to a sensitized paper. It is to this type apparatus that the present invention is directed.

SUMMARY OF THE INVENTION

It is a primary object of this invention to provide a simple and relatively inexpensive brush holder for a rectilinear type linear recorder for use in recording on electrically sensitive paper.

A still more important object of this invention is to provide a brush holder for a rectilinear sonar depth recorder that is simple, inexpensive, and easy to maintain.

These and other objects are realized and the limitations of the prior art are overcome in this invention by providing a simple framework of sheet metal which comprises a first part, to provide a prepared roll of electrically sensitive paper of a selected width and means to carry the paper from the roll over a plane metal back-up plate and onto a second take-up roller. An electrical contact plate is provided which is substantially co-planar with the back-up plate and parallel to it and spaced a selected distance from the leading edge of the back-up plate.

A loop of belt of a selected narrow width is supported by two spaced parallel rollers, one of which is driven by a motor at a selected speed. The belt is of plastic insulating material. It is positioned so that it runs with one linear portion of the loop being positioned a small distance in front of the plane of the back-up plate and the electrical contact plate.

A contact assembly, to which this invention is directed, is attached to the belt and travels with it. This consists of a lightweight thin metal contact holder which is attached to the belt and supports a wire contact means, such that the two ends of the wire are spaced on opposite sides of the belt so that as the belt moves transverse to the paper motion, one end of the wire contacts the electrical contact plate, and the other end of the wire contacts the surface of the electrically sensitive paper, which is backed by the metal back-up plate. Any potential that is applied to the electrical contact plate is transferred by the wire on the contact assembly, to the end of the wire contacting the paper. Thus, appropriate marks can be made on the paper as the belt travels so that the spacing of the marks is proportional to the time intervals between the electrical pulses that cause the mark to be made.

BRIEF DESCRIPTION OF THE DRAWINGS

These and other objects and advantages of this invention and a better understanding of the principles and details of the invention will be evident from the following description taken in conjunction with the appended drawings in which:

FIG. 3 is taken across the plane 3—3 of FIG. 1.

DESCRIPTION OF THE PREFERRED EMBODIMENTS

Figure 1:
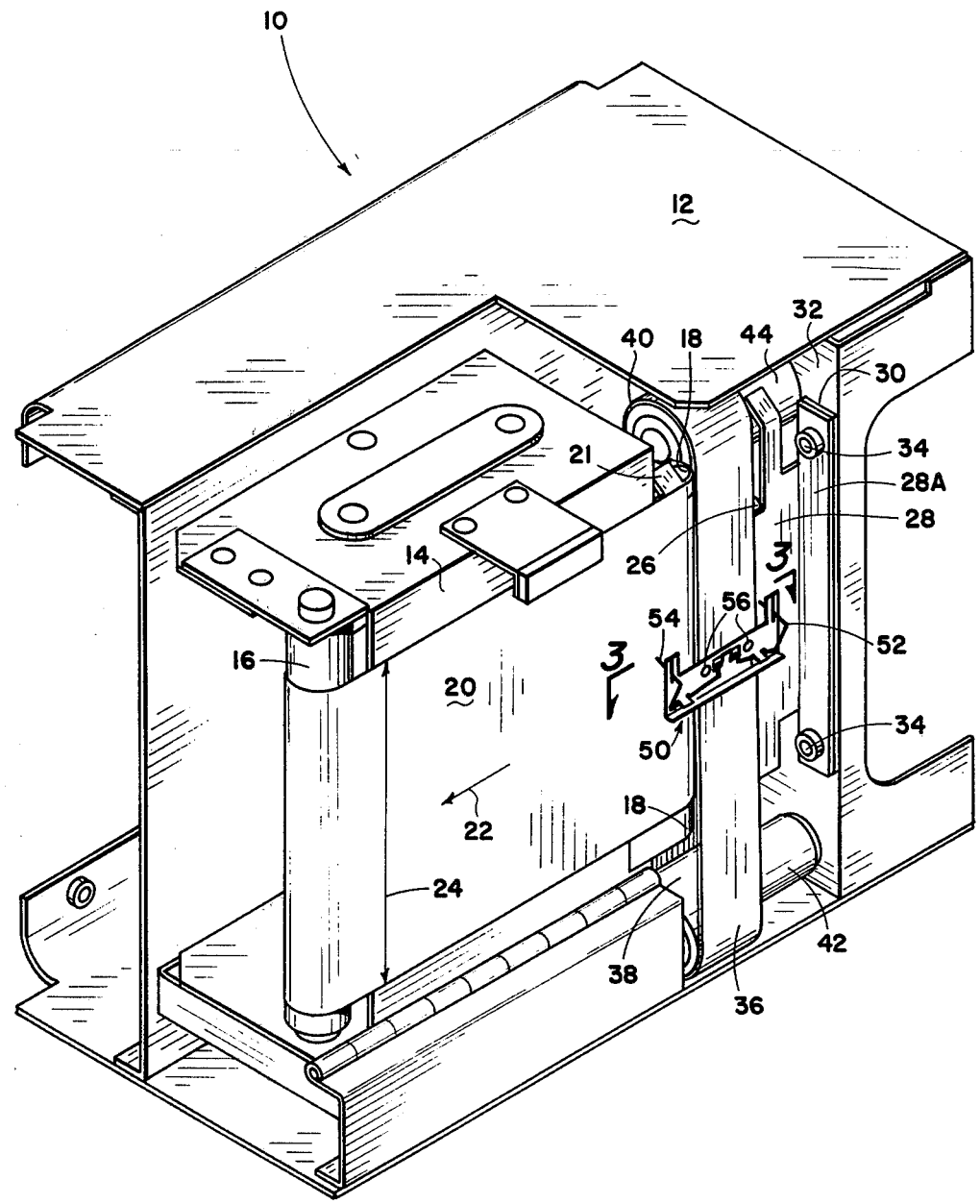
FIG. 1 represents an internal view of a portion of a rectilinear recorder adapted to handle a roll of electrically sensitive paper of a selected width.

Referring now to the drawings and in particular to FIG. 1, there is shown portions of an assembly of a rectilinear recorder, indicated generally by the numeral 10. There is a frame 12 made up of sheet metal to provide a structure to hold the various cooperating parts of the recorder.

Figure 3:
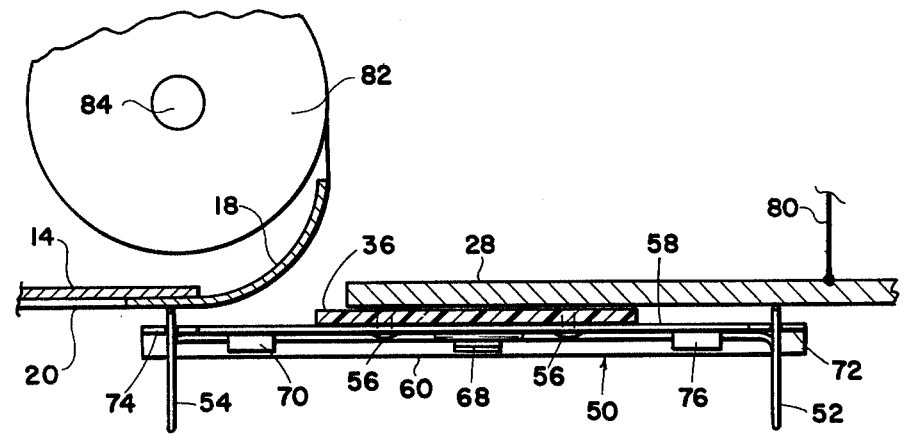

As shown in FIGS. 1 and 3, there is a roll of paper 82 which is supported on a spindle 84 which holds a quantity of strip electrically recording paper, such as the well-known Teledeltos paper manufactured by the Western Union Company.

The paper strip 20 unrolls from the roll 82 and feeds around a curved metal portion 18 of the metal back-up plate 14. The strip 20, as shown in FIG. 1, moves across the full length of the back-up plate and passes around a roller 16 to a take-up roll, not shown but well known in the art. The paper drive system otherwise is conventional.

As shown in FIGS. 1 and 3, co-planar with the back-up plate 14 is an electrical contact plate 28 which is spaced from and co-planar with the back-up plate 14. The electrical contact plate is parallel to the edge of the back-up plate 14. The electrical contact plate 28 has an angle portion 28A which is supported against a wall 32 of the framework 12. The electrical contact plate is insulated by a strip 30, and with an insulated nut and bolt 34, as is well known in the art. Means are provided as shown in FIG. 3 for attaching a conductor 80 to the electrical contact plate 28.

An endless belt loop 36 is supported by a pair of parallel spaced rollers 38 and 40 which are supported on pedestals 42 and 44 respectively from the wall 32 of the framework 12. Means are provided to drive one of the rollers such as 38, for example. As the rollers are driven, the belt loop travels in a direction transverse to the direction 22 of the paper strip or web 20.

The belt is positioned with its plane parallel to the planes of the back-up plate 14 and the electrical contact plate 28. A separate motor is provided to drive the belt so that individual speeds of the belt and of the paper web can be individually adjustable. The width 24 of the recorder paper strip is of selected magnitude so as to provide a suitable space to record the information which is to be recorded.

Figure 2:
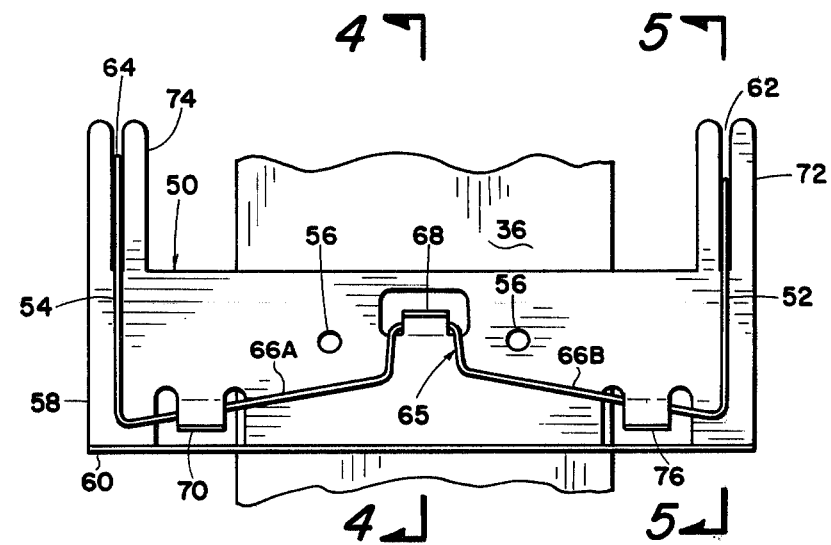
FIGS. 2 and 3 illustrate two views of the electrical contact assembly which is attached to the moving belt.

The essence of this invention is an electrical contact assembly, indicated generally by the numeral 50 which is supported on the belt at a selected point by means of rivets 56, or equivalent. As shown in FIG. 2, the electrical contact assembly 50 comprises a thin metal strip 58 which is positioned transverse to the length of the belt. The strip 58 is longer than the width of the belt so that its two trailing ends or forks 72 and 74 overhang the belt 36, by a selected dimension. There are slots 62 and 64 in two trailing ends of forks 72 and 74 respectively of the strip 58.

Figure 4:
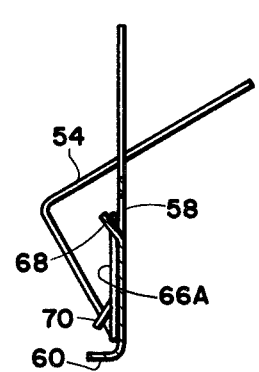
FIGS. 4 and 5 represent cross-sectional views of FIG. 2 for the purpose of illustrating the wire contact.
Figure 5:
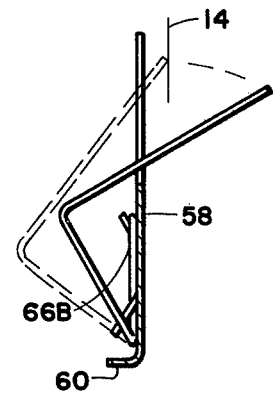

Means are provided for supporting a formed wire contact means that has a central planar portion 66A and 66B, and two contact portions 52 and 54, which are in planes substantially at right angles to the central portion. The strip 58 is provided with lips or spring clips 68, 70, and 76, respectively, to removably support the wire contact 65, with the plane portion in contact with the strip 58. The two ends 52 and 54 of the wire contact means are bent as shown in FIGS. 4 and 5 which are respectively cross-sectional views taken across planes 4—4 and 5—5 of FIG. 2.

With the two central portions of the wire contact means flat against the strip or holder plate 28, the ends 52 and 54 are bent backwards in a trailing direction to the motion of the plate 58. In a transverse view as in FIGS. 4 and 5, the wires are bent up, away from the plate, and then down, so as to pass through the grooves 62, 64 respectively. The ends then contact the web 20 and the contact plate 28 at a selected angle.

The length of the strip 58 is sufficiently wide so that the ends of the wire contact; namely, 52 and 54, straddle the width of the strip and are sufficiently separated so that the contact wire 52 will contact the electrical contact plate 28, while the other wire 54 will contact the surface of the paper strip 20.

There is sufficient clearance of all the working parts of the recorder so that except for the movement of the contact assembly across the paper 20 the wires are free of contact with any parts of the equipment. Thus, the belt can make a complete loop and the contact wires will then be in position again to make another traverse across the paper. Thus, by continuing the rotation of the belt, successive traverses across the paper can be made while the paper is slowly moving in a direction perpendicular to the travel of the belt.

While only one contact assembly has been shown mounted on the belt, it will be clear that two or more of these contact assemblies can be mounted on the belt at preferably equally spaced positions around the circumference of the belt. Thus in one revolution of the belt, one, two or more traverses of the contact wire across the paper can be made. This can provide a higher density of traces on the recording paper.

What has been described is a contact assembly and a drive means for the contact assembly so that with a simplicity of equipment, rectilinear traces of a recording wire can be provided on a moving strip of paper. Depending on the type of electrically sensitive paper, of which there are many types available on the market (and it is not important so far as this invention goes, as to what particular type is used), it is possible to draw a black line, or series of black dots, or short lines, according to the voltage which is applied to the contact plate 28 while the wire is moving across the paper. Thus, this recorder as described can be used for printing black and white patterns which are a result of traverses, of the contact wire across the paper.

It is well known that with certain types of electrically sensitive paper it is possible to make darker or lighter lines, or spots, by varying the magnitude of the voltage applied to the contact plate so that a two-dimensional display in variable density can be made with this recorder.

If this recorder is to be responsive to a repetitive analog signal, it must be synchronized in some way, such as by use of a synchronous motor drive for the belt, for example. However, it is possible also to generate the signal which initiates the process to be recorded, by the motion of the belt itself. This involves attaching to the belt at a selected point on the belt, spaced from the contact assembly, so that as the belt rotates, this signal initiator will cooperate with a corresponding part of the electrical circuit that generates the signal to initiate the signalling system. Of course, the signal initiator can be the contact assembly itself.

For example, in the case of a sonar recorder, the signal initiator can cause a circuit to be closed or initiated that will generate a transmitted sonar pulse into a body of water. The reflected sonar signal will then be received and will generate a voltage at the instant of reception, which voltage can then be applied to the contact plate 28 to cause a mark to be made on the paper.

Similarly, a mark can be made on the paper at the instant of transmission of the sonar pulse, so that the spacing between the two spots, one at the initiation and the other at the reception of the return signal, will indicate the time of travel and the distance from the sonar source to the reflecting surface. By having the initiator fixed to the belt, then the first mark of the initiation will occur only at a fixed position of the belt, and the mark corresponding to the reception of the reflected signal will occur at various positions representative of various distances or depths.

One type of initiator can be a bolthead or nut attached to the belt that closes a switch as it moves past a certain position. Preferably it can be a bolt head or nut of magnetic material which moves past the end of a solenoid coil and serves to generate an induced voltage in the coil which can be amplified and caused to initiate the sonar pulse. Of course, if there are two or more recording assemblies on the belt, there should correspondingly be two or more of the source initiators positioned on the belt.

It will be seen that the part 18 has a small strip 20 extending upwardly from the edge of the part 18. This is for the purpose of causing the wire 54 to follow the slope of the strip 21 to get to the surface of the back-up plate and the paper. Similarly, there is another tilted strip 26 on the electrical contact paper for the same purpose with the wire 52.

FIG. 3 is a view taken across the plane 3—3 of FIG. 1 and clearly shows the co-planar back-up plate 14 and electrical contact plate 28 which are spaced apart. The belt 36 runs slightly in front of the contact plate 28 and carries the contact assembly which is attached to the belt by means of rivets 56 or other suitable means. Here again, there is shown that the wires 52 and 54 are fitted into the slots 62 and 64 which guide them laterally so that as the belt moves a straight line will be drawn by the wire 54 on the paper 20.

What has been described is a recorder with an improved contact assembly means which has a number of important advantages:

1. The torsional spring action of the wire provides a substantially constant force of the contact wire against the web in spite of variations in spacing between the belt and the web.
2. The design provides for a substantially constant angle of contact of the wire to the web.
3. The low mass of the contact assembly makes for improved operation of the belt.
4. The lateral guidance of the wire provided by the slots in the trailing forks provides a true linear motion of the wire across the web.
5. The ease with which the contact wires can be attached to and removed from the contact holder provides simple and rapid replacement of wires.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. In a rectilinear sonar depth recorder having means responsive to a recording means to initiate an outgoing sonar signal and means to generate an electrical pulse to record on a web of recording material, a mark at the time of reception of the return sonar signal, said recorder comprising;
   (a) a web of recording material supported by a roll and a parallel spaced roller, so as to move longitudinally in contact with and across a plane metal back-up plate;
   (b) a belt means supported by a pair of spaced rollers and means to move said belt in a direction transverse to the longitudinal motion of said web; one linear portion of the loop of said belt parallel to and spaced a selected distance from said plane metal surface;
   (c) electrical contact plate means positioned adjacent to, and parallel to, said linear portion of said loop of said belt;
   (d) a first means attached to said belt, adapted to cooperate with said means to initiate said outgoing sonar signal, to initiate said signal; and
   (e) contact assembly means attached to said belt at a selected point relative to said first means;
   the improvement in said contact assembly means, comprising;
   (f) contact holder means comprising a plate of thin metal attached to said belt, said plate transverse to the length of said belt and long enough to extend over both edges of said belt, and including a first and second slot in two trailing edges or forks of said plate, one fork and slot near each end of said plate;
   (g) contact means supported on said contact holder means comprising metal wire formed so that the two ends of said wire are spaced apart at a selected distance and are adapted to press respectively, one end on said electrical contact plate means, and the other end on said web;
   whereby as said belt, said contact holder means, and said contact means moves transverse to said web when said electrical pulse appears on said electrical contact plate means, it is carried to said web by said contact means to provide a mark on said web; and wherein
   (h) said metal wire contact means includes a central portion removably attachable to said metal plate in a generally transverse direction to said belt and having two end portions which are bent to extend backwardly in planes generally parallel to said belt, and to slide in and be guided transversely by said slots, respectively, and to press respectively on said electrical contact plate means and said paper.

2. The contact assembly means as in claim 1 in which said contact holder means has a plurality of spring clips formed in its surface in a two-dimensional array, and said wire contact means is bent in its central portion, so as to be held to the plane of said holder means by said clips.

3. The contact assembly means as in claim 2 in which said plurality of spring clips include two spaced widely apart near the leading edge of said holder means and a third spring clip at the middle of and near the trailing edge of said holder means.

4. The contact assembly means as in claim 3 in which the trailing ends of said wire contact means are bent backwardly at substantially 90° to the leading edge of said holder means, and upwardly, and then downwardly, to pass through said slots in said forks, and to contact said web and said contact plate means at a selected angle.

* * * * *